(12) United States Patent
Stählin

(10) Patent No.: US 8,498,610 B2
(45) Date of Patent: Jul. 30, 2013

(54) METHOD AND SYSTEM FOR TRANSMITTING AN EMERGENCY CALL

(75) Inventor: Ulrich Stählin, Eschborn (DE)

(73) Assignee: Continental Teves AG & Co. oHG (DE)

( * ) Notice: Subject to any disclaimer, the term of this patent is extended or adjusted under 35 U.S.C. 154(b) by 194 days.

(21) Appl. No.: 12/746,032

(22) PCT Filed: Apr. 25, 2008

(86) PCT No.: PCT/EP2008/055065
§ 371 (c)(1),
(2), (4) Date: Nov. 15, 2010

(87) PCT Pub. No.: WO2009/071338
PCT Pub. Date: Jun. 11, 2009

(65) Prior Publication Data
US 2011/0124311 A1    May 26, 2011

(30) Foreign Application Priority Data
Dec. 6, 2007  (DE) .......................... 10 2007 059 025

(51) Int. Cl.
*H04W 4/22* (2009.01)
(52) U.S. Cl.
USPC .............. 455/404.2; 455/456.1; 455/466; 340/429; 340/436; 342/357.31
(58) Field of Classification Search
USPC ............. 455/404.2, 456.1, 466; 340/429, 340/436; 342/357.31
See application file for complete search history.

(56) References Cited

U.S. PATENT DOCUMENTS

| 6,791,456 | B2* | 9/2004 | Nakayama et al. | 340/429 |
| 2004/0192348 | A1* | 9/2004 | Gudmundsson et al. | 455/456.1 |
| 2005/0030224 | A1* | 2/2005 | Koch | 342/357.07 |
| 2006/0258379 | A1* | 11/2006 | Oesterling et al. | 455/466 |
| 2007/0132564 | A1* | 6/2007 | Dickmann et al. | 340/436 |

FOREIGN PATENT DOCUMENTS

| DE | 38 39 959 A1 | 4/1990 |
| DE | 103 38 759 A1 | 3/2005 |
| EP | 1 494 492 A1 | 1/2005 |
| EP | 1 814 093 A1 | 8/2007 |

\* cited by examiner

*Primary Examiner* — Meless N Zewdu
*Assistant Examiner* — Jean Chang
(74) *Attorney, Agent, or Firm* — RatnerPrestia

(57) ABSTRACT

A method and a system for transmitting an emergency call from a vehicle in an accident to an emergency call center, including:
(a) an automatic accident monitoring unit in the vehicle with a sensor system for detecting an accident of the vehicle,
(b) a vehicle navigation unit for determining the associated geographic accident coordinates (x,y) of the vehicle, wherein electronic means for generating an emergency call in text form, including at least the accident coordinates (x,y) determined for the vehicle, which includes the official license number of the vehicle for the purpose of dataset identification, and
(c) a mobile radio unit for transmitting the text form of the emergency call for the reception for the emergency call center.

11 Claims, 1 Drawing Sheet

METHOD AND SYSTEM FOR TRANSMITTING AN EMERGENCY CALL

CROSS REFERENCE TO RELATED APPLICATIONS

This application is the U.S. national phase application of PCT International Application No. PCT/EP2008/055065, filed Apr. 25, 2008, which claims priority to German Patent Application No. 10 2007 059 025.5, filed Dec. 6, 2007, the contents of such applications being incorporated by reference herein.

FIELD OF THE INVENTION

The present invention relates to the transmitting of an emergency call from a vehicle in an accident to an emergency call center. In particular, the invention relates to a system for transmitting such an emergency call, a corresponding method and also a computer program product related thereto, a computer-readable medium and an electronic device containing the latter on board a vehicle.

BACKGROUND OF THE INVENTION

In road traffic, the traffic density of motor vehicles continuously rises. The road network is approaching its limits of extension. This leads to an accident risk which rises analogously hereto. Although the accident risk can be minimized by means of modern driver assistance systems and the like, it cannot be eliminated, however. In the case of a traffic accident, in particular, rapid medical aid for damaged persons on the spot is required, in particular. The field of use of the present invention extends to a system-related accident logistic created for just this purpose.

In the general prior art, an automatic emergency call system with the designation "eCall" is known in which a message to an emergency call center is automatically transmitted in the case of an accident. For this purpose, the vehicles are equipped with electronic devices, so-called accident monitoring units. The accident monitoring unit is an electronic box connected to the vehicle electrical system, to the input of which an accident sensor is connected. In the simplest case, the accident sensor can be an acceleration sensor which outputs an accident signal above a predeterminable threshold value of a negative acceleration of the vehicle which is above the negative accelerations caused by the normal braking forces of the vehicle. Following this, the accident monitoring unit determines the current position of the vehicle by the connected positioning system, preferably the GPS positioning system of the vehicle navigation. This information is automatically supplied in the form of an emergency call to the emergency call center which clarifies the situation and, if necessary, requests help nationally and internationally. By knowing the accurate accident location and additional information such as personal data, time of accident and the like, the rescue forces can act optimally. Apart from an activation of the accident help by automatic sensor system, manual triggering by emergency call key in the vehicle is also provided. In addition, there is the possibility that the emergency call center can establish voice contact with the passengers in the vehicle in order to obtain, for example, further information on the severity of the accident. For this purpose, and for the purpose of transmitting the emergency call to the emergency call center, a mobile radio unit is also required which is connected to the accident monitoring unit. Optionally, it is possible to transmit data from other vehicle safety systems such as airbag equipment, safety belt sensor, rollover sensor, which allow conclusions about the severity of the accident event and the number of passengers.

EP 1 814 093 A1, which is incorporated by reference herein, discloses a generic system and method. Immediately after the emergency call is triggered, the geographic accident coordinates, together with identification data of the vehicle are transmitted in the form of a digital data message digitally from a mobile radio unit via a mobile radio network to the central call unit. For this purpose, the SMS standard can be used, for example. The data thus transmitted are processed by the central call unit to form an advisory image and provided on an access-protected Internet page which is provided with graphical map material from which it can be seen where the vehicle is located. In addition, supplementary information can be transmitted by a telephone call to a local emergency call answer desk of the vehicle or by a central emergency call answer desk which informs the local rescue coordination center by a telephone call. The advisory image is here interrogated via the Internet by the locally responsible local rescue coordination center after authentication at the Internet server.

The disadvantageous factor in this technical solution is found to be the completely graphical communication by advisory image which complicates the transmission of important additional information because of the graphically defined data format. Furthermore, an Internet access and further equipment is required.

SUMMARY OF THE INVENTION

It is an object of the present invention, therefore, to improve a generic method or system for transmitting an emergency call from a vehicle in an accident to an emergency call center in such a manner that efficient emergency call logistics can be ensured with minimum technical expenditure.

The invention includes the method-related teaching that after the detection of an accident of the vehicle via a corresponding sensor system of an automatic accident monitoring unit in the vehicle and after determination of the associated current geographic accident coordinates of the vehicle by vehicle navigation unit, according to aspects of the invention, an emergency call is generated in a special text form which, apart from the accident coordinates determined for the vehicle is provided with the official license number of the vehicle for the purpose of dataset identification in order to forward this emergency call to the emergency call center via mobile radio channel via a suitable transmission protocol.

It should be pointed out at this point that, in the context of the present invention, the expression "geographic accident coordinates" are obtained in conjunction with a positioning system which belong to the global satellite navigation systems (GMSS) such as, for example, GPS, Gallileo, GLONASS (Russia), Compass (China), IRNSS (India) and the like.

In the context of the present invention, these are preferably understood to be coordinates which are output by a GPS vehicle navigation unit. It is also conceivable that instead of geographic accident coordinates, a cartographic accident position of the vehicle which is calculated by the vehicle navigation unit is directly a component of the emergency call in text form. The term "cartographic accident position" is then understood to be a type of postal address such as country, town, street, house number or milestone along the freeway. Furthermore, "emergency call center" is understood to be a central unit in an emergency call system which unit receives transmitted emergency calls from vehicles in accidents, operating manually or also fully automatically by means of computer technology, processes these as data and forwards them to an emergency call center for coordinating the action of rescue vehicles or directly to rescue vehicles in the vicinity of the location of the accident which thus form a mobile call center to this extent. For example, the accident station of a hospital could be a stationary rescue coordination center which is equipped with communication technology for coordinating incoming accident messages from the emergency call center logistically so that rapid aid can be provided at the accident location.

The advantage of the solution according to aspects of the invention consists, in particular, in that no special technical equipment must be provided by the emergency call center or the rescue coordination center in order to implement it since the emergency call is preferably produced in man-readable standardized text form. Preferably, the SMS standard widely used in mobile radio technology is suitable for transmitting the emergency call in the text form being the subject matter of the invention. Besides that, however, it is also conceivable to use other mobile data transmission standards based on, for example, GPRS (General Packet Data Service), UUS (User-Two-User-Signaling), USSD (Unstructured Supplementary Service Data) or UMTS (Universal Mobile Telecommunications System) and corresponding mobile radio network gateways to the emergency call center.

According to one measure improving the invention, it is proposed that the emergency call present in text form is converted into voice information by the emergency call center or an immediately preceding central unit in order to forward the emergency call containing the license number of the vehicle by voice channel to a responsible emergency call center or directly to rescue vehicles—depending on the system structure.

Such text conversion (Text-to-Speech) is meant to be a media conversion, that is to say the conveying, transformation or conversion of a file from one file format into another one. This applies both to the transfer of data between different media and file systems and for the transmission of data from one storage medium to another one. The text data received are converted, for example, into video data or audio data which can be represented orally or orally/visually by many terminals such as, for example, mobile telephones. This media conversion can also occur manually, for example, in that an operator converts the text by reading into voice which is received by microphone and forwarded. Besides that, however, it is also conceivable that the media conversion occurs fully automatically by computer by utilizing generally known text-to-speech software.

If the cartographic accident position of the vehicle is not already being transmitted by the emergency call, but only the geographic accident coordinates, it is also possible, according to an alternative embodiment of the invention, to correlate the cartographic accident position centrally by the emergency call center. To this extent, the geographic accident coordinates of the vehicle which are received with the emergency call are converted by means of a digital map into a cartographic accident position comprising an address specification.

It is especially this alternative embodiment which opens up the possibility of allocating to the emergency call further vehicle- or keeper-specific supplementary information by means of the dataset identification in the form of the official license number of the vehicle from a central information database allocated to the emergency call center, in order to advantageously be able to plan the upcoming rescue operation better. Such supplementary information can be, for example: vehicle type, licensed number of persons and/or vehicle color. In particular, the vehicle color plays an essential role in the allocation of an emergency call to a triggering vehicle in an accident since this information provides for rapid identification at the accident location.

The dataset identification which is a subject matter of the invention should preferably be executed in the form of a prefix of the emergency call generated in text form. To this extent, the dataset identification can be used as identification key for the database.

The solution according to aspects of the invention can also be embodied as computer program product which, when it is executed on a processor of an accident monitoring unit, instructs the software of the processor to perform the associated method steps which are subject matter of the invention.

In this connection, a computer-readable medium also belongs to the subject matter of the invention on which a computer program product described above is stored retrievably.

BRIEF DESCRIPTION OF THE DRAWINGS

The invention is best understood from the following detailed description when read in connection with the accompanying drawings. Included in the drawings is the following Figures.

The representations in the Figures are diagrammatic and not to scale.

DETAILED DESCRIPTION OF THE PREFERRED EMBODIMENTS

Figure 1:
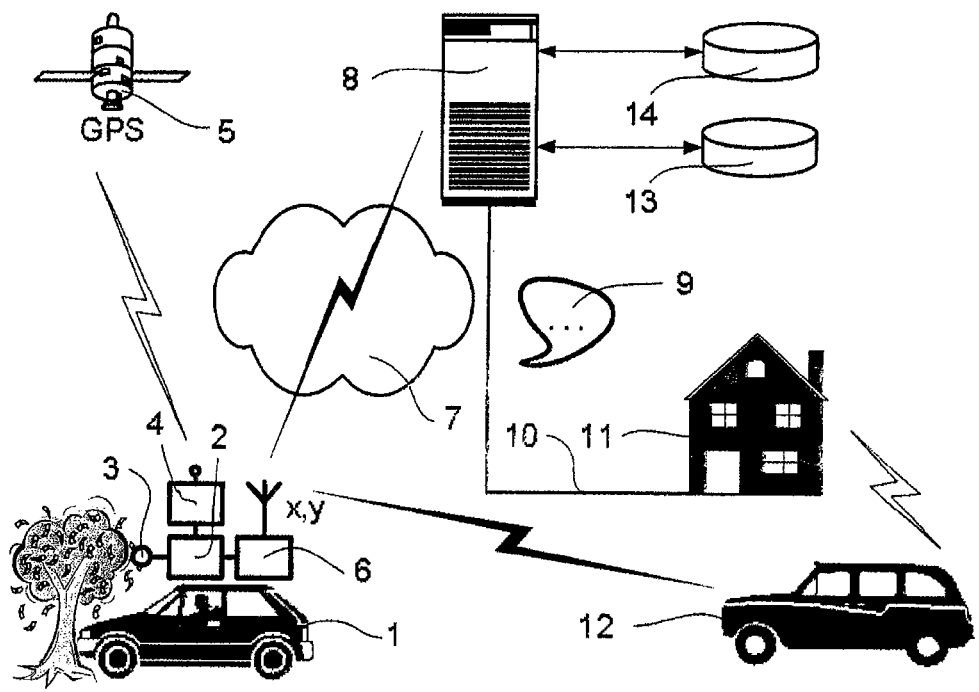
FIG. 1 shows a diagrammatic representation of a system for transmitting an emergency call from a vehicle in an accident to an emergency call center.

According to FIG. 1, a vehicle 1 in an accident contains an accident monitoring unit 2 which is constructed as electronic box and is supplied with voltage via the on-board electrical system of the vehicle 1. The accident monitoring unit 2 is connected at its input to a sensor system 3 which detects the accident event. The sensor system 3 is in this case constructed as acceleration sensor for detecting a negative acceleration in consequence of the abrupt stopping of the vehicle 1 by accident. Triggered by this, the accident monitoring unit 2 detects the geographic accident coordinates of the vehicle 1. For this purpose, the accident monitoring unit 2 is connected at its input to a vehicle navigation unit 4. The vehicle navigation unit 4 determines the geographic accident coordinates via GPS satellites 5. At the output of the accident monitoring unit 2, a mobile radio unit 6 of the vehicle 1 is connected by means of which the emergency call is transmitted in text form wirelessly by mobile radio network 7 to an emergency call center 8. The mobile radio unit 6 can also be a part of the accident monitoring unit 2. The accident monitoring unit 2 in the vehicle 1 contains electronic means for generating the emergency call after detection of an accident which is output in text form. Besides the determined accident coordinates xy which are obtained from the vehicle navigation unit 4, the text form of the emergency call is provided with a special dataset identification. This dataset identification corresponds to the official license number of the vehicle 1 and is used for dataset identification. In the present exemplary embodiment, the official license number is prefixed before the emergency call dataset as letters and sequence of numbers, omitting blanks and special characters. This also takes into consideration the country code (D)—for example for Germany—of the vehicle 1 which specifies the country in which the vehicle 1 is licensed. This dataset identification as a whole is then placed as prefix before the emergency call generated in text form.

In this exemplary embodiment, the emergency call is sent by SMS to the emergency call center 8 via the mobile radio network 7. In this exemplary embodiment, the emergency call center 8 is constructed as a computer. On this computer, a text-to-speech application is installed. This is used for converting the emergency call into voice information 9. Following this, the emergency call containing the license number of the vehicle 1 is transmitted to a responsible rescue coordination center 11 by a voice channel 10. The rescue coordination center 11 subsequently coordinates the deployment of rescue vehicles 12 for the purpose of providing help at the accident location of the vehicle 1. The emergency call center 8 can also be a part of the rescue coordination center 11.

To provide more comprehensible communication of the accident location, the emergency call center 8 allocates in the present exemplary embodiment the received geographic accident coordinates x,y of the vehicle 1 to a cartographic accident position comprising an address specification by means of a digital map 13 implemented therein. This is subsequently transmitted by voice to the rescue coordination center 11.

In addition, a central information database 14 which contains vehicle- or keeper-specific supplementary information for the emergency call such as, in particular, vehicle type, number of seats and/or vehicle color, is allocated to the emergency call center 8. This supplementary information can be appended to the emergency call by means of the dataset identification, for voice transmission to the rescue coordination center 11.

Figure 2:
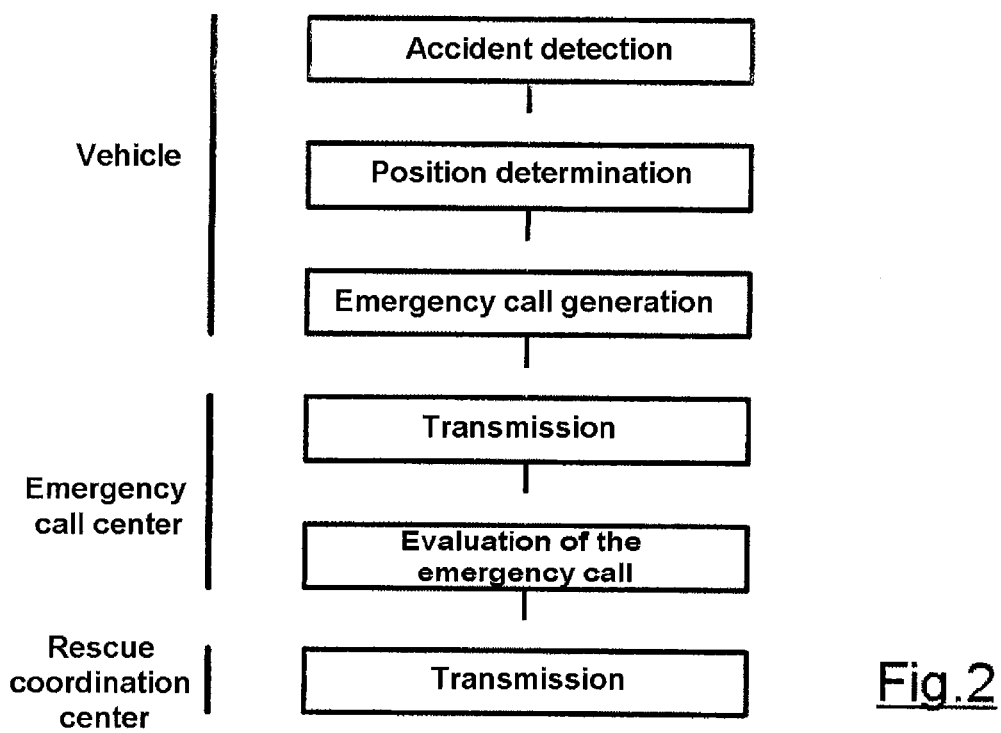
FIG. 2 shows a flowchart of a method, performed by the system according to FIG. 1, for transmitting the emergency call.

According to FIG. 2, the transmission of an emergency call from a vehicle in an accident occurs as determined by the following method steps:

Firstly, the accident of the vehicle is detected via the sensor system, described above, by the accident monitoring unit of the vehicle. Following this, the associated geographic accident coordinates x,y of the vehicle are determined by using the vehicle navigation implemented in the vehicle. Following this, the emergency call is generated in a special text form by the accident monitoring unit in that the accident coordinates determined are linked to a dataset identification which corresponds to the official license number of the vehicle. Then the emergency call is transmitted by mobile radio channel in this text form to the emergency call center. Subsequently, the emergency call is evaluated in order to transmit it to a responsible rescue coordination center.

The solution according to aspects of the invention is not restricted to the representations in the exemplary embodiment described above. Instead, deviations therefrom are also conceivable which are also comprised in the scope of the following claims. Thus, for example, it is also possible that the accident coordinates are converted into a cartographic accident position (address specification) directly in the vehicle by using the vehicle navigation unit for this purpose. However, it must be ensured then that this mathematical operation can still be performed on board the vehicle in spite of the accident. Furthermore, it is also conceivable to occupy the emergency call center manually and to convert the emergency calls preferably received by SMS directly into a voice for communication with the responsible rescue coordination center by an operator. This alternative allows supplementary information, which could be obtained from supplementary information databases, for example vehicle- or keeper-specific information, also to be included flexibly in the emergency call. In addition, the solution according to aspects of the invention is flexible with regard to the telecommunication networks. For example, the rescue coordination center can also be integrated mobile in a vehicle so that the mobile radio network is also suitable for transmitting the voice information from the emergency call center to the mobile rescue coordination center.

Finally, it should be pointed out that the terms "comprise" and "have" do not exclude any other elements or steps and "one" does not exclude a multiplicity. Furthermore, it should be pointed out that features or steps which have been described with reference to one of the above exemplary embodiments can also be used in combination with other features or steps of other alternatives described above.

The invention claimed is:

1. A method of transmitting an emergency call from a vehicle involved in an accident to an emergency call center, comprising the steps of:
    detecting an accident of the vehicle via a sensor system of an automatic accident monitoring unit in the vehicle,
    determining associated geographic accident coordinates (x,y) of the vehicle by a vehicle navigation unit,
    generating an emergency call in text form, comprising text of the accident coordinates (x,y) determined for the vehicle and text of an official license number of the vehicle configured as a prefix to the emergency call, and transmitting the text form of the emergency call via mobile radio channel to the emergency call center, wherein the emergency call transmitted in text form is sent to the emergency call center in a man-readable standardized data format, and the official license number is used as identification key for a database in the emergency call center so as to facilitate rescue actions.

2. The method as claimed in claim 1, wherein the emergency call transmitted in the text form is sent by SMS to the emergency call center.

3. The method as claimed in claim 1,
    wherein the text form of the emergency call is converted into voice information by the emergency call center itself or an immediately preceding central unit, in order to forward the emergency call containing the license number of the vehicle to a responsible rescue coordination center or a rescue vehicle by voice channel.

4. The method as claimed in claim 1,
    wherein a cartographic accident position comprising an address specification is allocated to the geographic accident coordinates (x,y) of the vehicle by a digital map.

5. The method as claimed in claim 4,
    wherein the cartographic accident position is obtained in the vehicle by utilizing an on-board vehicle navigation unit.

6. The method as claimed in claim 1,
    wherein the vehicle or keeper-specific supplementary information is appended to the emergency call by using information from a central information database allocated to the emergency call center.

7. A system for transmitting an emergency call from a vehicle involved in an accident to an emergency call center, comprising:
    an automatic accident monitoring unit in the vehicle with a sensor system for detecting an accident of the vehicle,
    a vehicle navigation unit for determining an associated geographic accident coordinates (x,y) of the vehicle,
    electronic means for generating an emergency call in text form, comprising text of at least the accident coordinates (x,y) determined for the vehicle, which comprises text of an official license number of the vehicle configured as a prefix to the emergency call, and a mobile radio unit for transmitting the text form of the emergency call to the emergency call center, wherein the emergency call transmitted in text form is sent to the emergency call center in a man-readable standardized data format, and the official license number is used as identification key for a database in the emergency call center so as to facilitate rescue actions.

8. The system as claimed in claim 7,
wherein the prefix also comprises a country code (D) of the vehicle.

9. The system as claimed in claim 7,
wherein the vehicle or keeper-specific supplementary information is selected from a group consisting of vehicle type, licensed number of persons and vehicle color.

10. A non-transitory computer-readable medium on which a computer program product is stored which, when executed instructs a computer processor to perform the following steps:

generate an emergency call in text form, comprising text of at least an accident coordinates (x,y) determined for a vehicle, including text of an official license number of the vehicle configured as a prefix to the emergency call, and transmit the text form of the emergency call via mobile radio channel to the emergency call center, wherein the emergency call transmitted in text form is sent to the emergency call center in a man-readable standardized data format, and the official license number is used as identification key for a database in the emergency call center so as to facilitate rescue actions.

11. An electronic device on board a vehicle for transmitting an emergency call, comprising a vehicle navigation unit, a mobile radio unit and an accident monitoring unit with a computer-readable medium as claimed in claim 10.

* * * * *

UNITED STATES PATENT AND TRADEMARK OFFICE
CERTIFICATE OF CORRECTION

PATENT NO. : 8,498,610 B2  Page 1 of 1
APPLICATION NO. : 12/746032
DATED : July 30, 2013
INVENTOR(S) : Ulrich Stählin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 355 days.

Signed and Sealed this
Fifteenth Day of September, 2015

Michelle K. Lee
*Director of the United States Patent and Trademark Office*